Oct. 27, 1942.　　　　M. C. SCHWAB　　　　2,300,067
SHIP
Filed Sept. 18, 1941
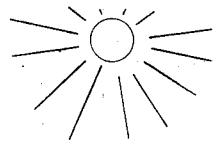
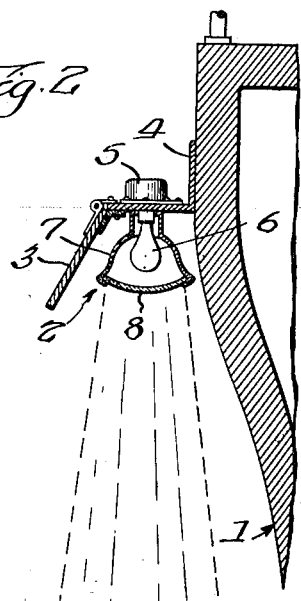
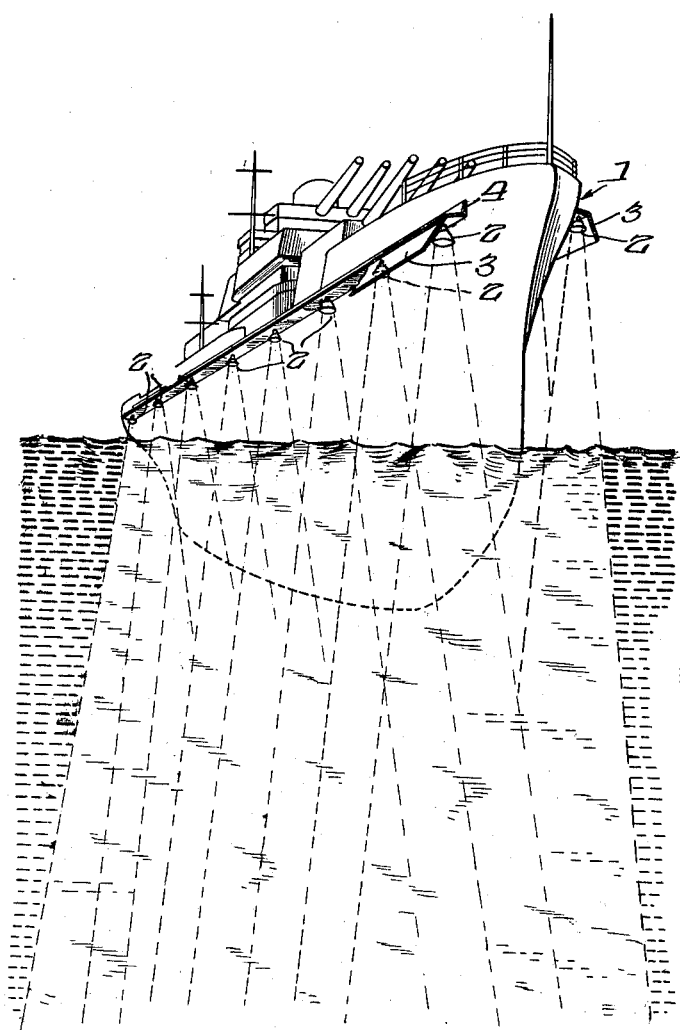

Patented Oct. 27, 1942

2,300,067

UNITED STATES PATENT OFFICE 2,300,067

SHIP

Martin C. Schwab, Chicago, Ill.

Application September 18, 1941, Serial No. 411,369

4 Claims. (Cl. 114—15)

In my co-pending application, Serial No. 411,371, for Submarine, filed of even date with the instant application, I have disclosed a submarine adapted to locate surface craft by their shadows, and to attack said craft from below the surface of the water. Said co-pending application also discloses an improved form of torpedo adapted to travel vertically toward its target. The present invention embraces surface watercraft camouflaged to escape submarine detection and attack by craft such as that disclosed in my aforesaid co-pending patent application, Serial No. 411,371.

The present invention resides in providing suitable illuminating means placed along the sides of the ship above the water line and directed downwardly to dissipate any shadow that might be cast by said ship, whether by night or by day, and whether in clear weather or foggy. The illuminating means are appropriately screened so as not to attract the attention of enemy aircraft.

The foregoing and such other objects, advantages, or capabilities as may appear herein, or as may be pointed out as this description proceeds, or as are inherent in the present invention, are illustrated in the accompanying drawing, in which:

Figure 1 is a perspective view of a surface boat, exemplified by, but not limited to, a battleship, and provided with the camouflage-through-light system of the present invention.

Figure 2 is a fragmentary detail vertical transverse sectional view of the camouflage means shown in Figure 1.

Like reference characters are used to describe similar parts in the drawing and in the description of the invention which follows.

Referring now more particularly to Figure 1, the ship 1 is provided with a plurality of illuminating means 2 arranged about the periphery thereof well above the water line in such manner that the light therefrom is directed downwardly. All the illuminating means together cast sufficient light upon the surface of the water to dissipate any shadow that might be formed by the interposition of the boat between the sun and the sea. Thus a submarine which attempts to detect my improved camouflaged ship by the shadow thereof will be foiled.

The intensity of illumination may be varied in proportion to the intensity of the sunlight. For example, the illuminating means may be electric lights, and rheostats may be provided to control the quantity of electricity flowing through said lights. Said rheostats may be operated by a system including photo-electric cells, whereby the quantity of electricity flowing through the electric lights is continuously varied so that the intensity of illumination from said lighting means 2 is directly proportional to the intensity of the sun's illumination. Furthermore, the intensity of illumination may be varied from lamp to lamp. For example, if the ship's shadow is entirely to starboard, the starboard illuminating means may be placed in operation, while the port illuminating means are turned off.

Ordinarily the illuminating means 2 will be placed above the water and at a sufficient height to avoid any possibility of damage from the waves. Further, by having the light source a substantial distance above the surface of the water, the illumination that penetrates the surface is diffuse, and no definite illuminated object which could be used as a target will be apparent from beneath the surface of the sea.

While Figure 1 illustrates a ship having illuminating means along both sides thereof, it is clearly to be understood, nevertheless, that my invention also contemplates completely encircling the ship with said illuminating means.

A screen 3 preferably is provided to cut off any stray radiation and to conceal the illuminating means from enemy aircraft. As a matter of fact, the dissipation of the ship's shadow makes its detection more difficult from the air, and tends to confuse enemy aircraft.

Figure 2 illustrates in greater detail one embodiment of the present invention. It is distinctly to be understood, however, that the present invention is not limited to the specific means of illumination and the specific arrangement of parts disclosed in the present application.

In Figure 2, the bracket 4 is shown attached to the side of the ship 1. Mounted upon said bracket 4 is the housing 5 containing the necessary electrical connections. Depending from said bracket 4 is the electric light bulb 6. Said bulb 6 is suitably surrounded by a reflector 7. In the base of the reflector 7 is the lens 8. The reflector 7 and the lens 8 together form an envelope which completely encloses the light bulb 6. The entire illuminating assembly is adapted to direct light downwardly upon the surface of the water, as shown.

Also attached to the bracket 4 is the screen 3, to shield the illuminating assembly from observation, and to protect it from bullets or the like. The housing 5 may contain a ball and socket joint whereby the illuminating assembly may be rotated in order to vary the direction of the beam therefrom in accordance with the position of the sun, in order to efface the entire shadow. As will be apparent to those skilled in the art, automatic means may be provided for thus varying the angular position of the illuminating means with variations in the declination of the sun. In similar manner, the screen 3 may be hinged to the bracket 4 and may be oscillated as circumstances require.

While the invention has been described with particular reference to concealing water craft from enemy submarines located below the surface of the water, it will be apparent that my system of light camouflage may be employed wherever the dissipation of shadows will assist in concealing an object.

Having thus described my invention and illustrated its utility, I claim:

1. Watercraft camouflaged to escape submarine detection, comprising a hull, a plurality of illuminating means encircling said hull above the water line and directed downwardly to dissipate shadows cast by said watercraft, and screens positioned to conceal said illuminating means from observers situated above the water.

2. In watercraft as defined in claim 1, automatic means for operating said illuminating means, whereby the direction and intensity of illumination continuously is varied to correspond with the direction and intensity of the shadows cast by said watercraft.

3. Camouflage for ships, comprising illuminating means protruding from the sides of a ship above the water line and directing light upon the surface of the sea to dissipate shadows cast by the ship, and opaque screens positioned adjacent said illuminating means to conceal said illuminating means from enemy aircraft.

4. The method of concealing surface watercraft from submarines which comprises dissipating the shadow cast by said watercraft by illuminating said shadow by means of lights positioned on said watercraft above the surface of the sea.

MARTIN C. SCHWAB.